July 23, 1957 — H. VAN SWAAY — 2,800,129

METHOD OF FORMING SPLINTS

Filed Nov. 29, 1954

INVENTOR
HENRI VAN SWAAY
BY Hammond & Littell
ATTORNEYS

United States Patent Office 2,800,129
Patented July 23, 1957

2,800,129

METHOD OF FORMING SPLINTS

Henri van Swaay, The Hague, Netherlands

Application November 29, 1954, Serial No. 471,855

Claims priority, application Great Britain
November 30, 1953

3 Claims. (Cl. 128—90)

The invention relates to a form or a blank for making splints and other orthopaedic or surgical supports. The devices concerned are partly of the type used in fixation, as e. g. in the case of treatment of fractures, but mainly splints for forcing joints of the human body into a certain desired position, as is necessary when these joints are affected by certain rheumatic or other complaints. Also arch supports are to be considered as splints in this connection.

Tha splints and supports in question preferably should be of light material and readily applied, for example with the aid of bandages, slings or other means and also removed again. Plaster of Paris is no doubt a suitable material for this, but has the drawback of being heavy and voluminous, and easily crushed, so that the splinting has to be repeated again and again, which is unpleasant for the patient. Moreover it is difficult to clean.

It is better to make the splints or supports from sheet material. When they are to be made by beating and bending from metal or other sheet material, this calls for great manual dexterity, so that the medical practitioner always has to be assisted by a specialist, which makes the application of the splints and supports difficult and considerably raises their cost.

For this reason measures have been taken to make the splints from thermoplastic material. When a cast in plaster of Paris has then been made of the member or joint concerned, the medical practitioner himself will have little difficulty in making the splint, or an assistant will usually make it by starting from a pre-formed flat piece of thermoplastic material, heating this to a temperature at which it becomes sufficiently plastic, and then moulding this form on the plaster cast. It is also easy to make any subsequent corrections in the shape. The present invention aims at producing a further improvement of this process, and specifically aims at making the use of the plaster cast superfluous, which brings about a considerable simplification of the process.

According to the invention the starting material is also a blank of flat or at most slightly curved sheet material, which is thermoplastic and can be molded into the desired splint or the like by plastic three-dimensional transformation. According to the invention the sheet material consists of one or more—possibly perforated—layers of a solid thermoplastic material and a layer of foam, sponge or cellular plastics. Preferably the latter is firmly fixed on the former, at least on the side coming into contact with the part of the body to be splinted. The foam plastic used must retain its foam character at the temperature necessary for the plastic deformation of the solid layer or layers and must be likewise deformable. The heat conductivity and heat capacity of the foam plastic must be so slight that, even when brought into contact at this temperature with the human skin, the latter is not appreciably injured by it.

The blanks in question are therefore pre-formed pieces, which can be marketed in series and are suitable for different joints, parts, and members of the human body, and which in medical practice itself need only be heated and can then be moulded in the right shape on the human body itself, without any other treatment.

With reference to the accompanying drawings this will be explained more in detail.

The blank consists of a layer 1 of solid thermoplastic material, for example of the type of the transparent Plexiglass (e. g. methyl methacrylate). Non-transparent materials, such as polyethylene, may naturally also be used. This layer 1 is provided with plentiful perforations 2, which promote evaporation of the perspiration moisture produced underneath the splint when the latter is in use upon the human body and moreover reduces the weight of the splint to be subsequently moulded from it.

The entire surface of the layer 1 is covered with a layer of foam plastic (e. g. polyurethane foam), which is thoroughly fixed on to it, in general by gluing. This foam plastic must at any rate be pliable and soft, and resistant to the plasticizing temperature (as a rule not higher than about 170° C.) of the layer 1, without losing its distinctive foam character, its insulating capacity and its elasticity.

Figure 1:
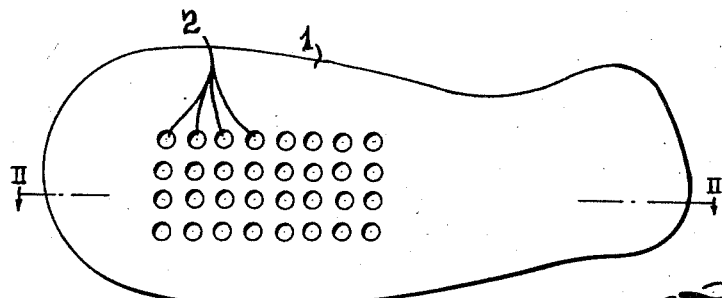
Fig. 1 is a small scale illustration of a flat blank suitable for splinting the wrist of a man's right hand.
Figure 2:
Fig. 2 is a cross-section on the line II—II in Fig. 1.

When the medical practitioner wishes to splint the wrist of a man's right hand, he need only heat the blank according to Figs. 1 and 2 in a suitable manner to the desired plasticizing temperature. Heating can be done e. g. by radiant heat, which besides renders it possible that the heat is applied exclusively or more intensively at the side of the solid material only. Upon the heating the practitioner can apply the perfectly soft blank immediately upon the wrist to be splintered, and attach it with a few bandages, preferably cool and therefore moist bandages or the like. The foam plastic is so chose that it insulates the heat absorbed by the blank in such a way from the human skin that the latter is not injured by the application of the hot blank, at most only becomes slightly red.

Figure 3:
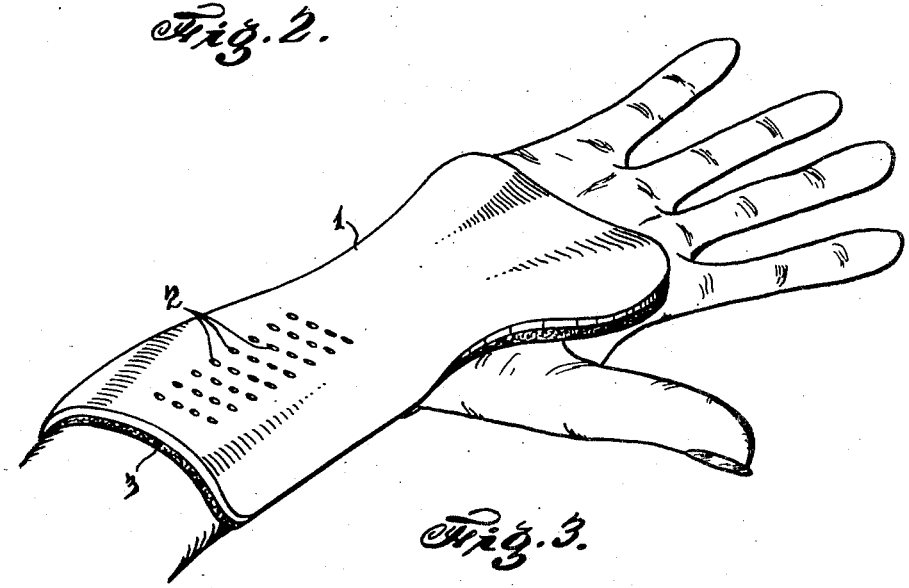
Fig. 3 is a perspective illustration of the result to be attained by the medical practitioner with the use of the form according to Figs. 1 and 2.

Very shortly after the application when the blank has cooled again, and assumed the desired shape and the desired rigidity, it can be used in the manner illustrated in Fig. 3, as a splint, fixed by means of a bandage, sling or the like. In some cases the splint may be so shaped that means for its fixation are superfluous, for example, when the splint is made annular so as to surround the human limb.

Although less advantageous, it is conceivable that the soft and porous layer (the foam layer) may be loose on the solid layer, and handled separately and applied to the human body independently of the solid layer. The solid layer may then be heated separately and applied on to the soft layer in situ, and moulded on to the same, whereupon they are together bandaged and so on.

This application is a continuation-in-part of my copending application Serial No. 383,239, filed September 30, 1953, now Patent No. 2,759,475.

What I claim is:

1. The method of applying a medical splint, which comprises heating a thermoplastic moldable splint blank to molding temperature, applying an insulating preformed foam layer in sheet form between the blank and the portion of the human body to be splinted, applying the heated splint blank wrapping a bandage around the heated blank and the portion of the body to be splinted, shaping the heated blank to the portion of the body to be splinted with the insulating foam layer in sheet form between the blank and the portion of the body to be splinted and allowing the blank to cool into its shaped form while the insulating foam layer is in contact with the portion of the body to be splinted.

2. The method of applying a medical splint, which comprises heating a thermoplastic moldable splint blank to molding temperature, applying an insulating preformed foam layer in sheet form between the blank and the portion of the human body to be splinted, applying the heated splint blank wrapping a moist bandage around the heated blank and the portion of the body to be splinted with the insulating foam layer in sheet form between the blank and the portion of the body to be splinted, shaping the heated blank to the portion of the body to be splinted and allowing the blank to cool into its shaped form while the insulating foam layer is in contact with the portion of the body to be splinted.

3. Method according to claim 1 in which the insulating foam layer is provided with an adhesive coating adhering to the splint blank when the latter is applied thereto.

References Cited in the file of this patent

UNITED STATES PATENTS

| 1,992,904 | Preston | Feb. 26, 1935 |
| 2,641,761 | Schultz | June 16, 1953 |
| 2,650,212 | Windemuth | Aug. 25, 1953 |

FOREIGN PATENTS

| 436,109 | Great Britain | Oct. 4, 1935 |
| 552,278 | Great Britain | Mar. 30, 1943 |
| 1,027,350 | France | Feb. 11, 1953 |
| 1,090,479 | France | Oct. 20, 1954 |

OTHER REFERENCES

Modern Plastics for November 1938, page 34. Copy in Science Library.